United States Patent
Garmong

[15] 3,676,614
[45] July 11, 1972

[54] CABLE REEL

[72] Inventor: Victor H. Garmong, R.D. #1, Kennerdell, Pa. 16374

[22] Filed: May 28, 1970

[21] Appl. No.: 41,250

[52] U.S. Cl................................191/12.2, 242/77.4, 242/86.5, 242/116
[51] Int. Cl. .................................H01r 39/00, H02g 11/02
[58] Field of Search ............191/12.2, 12.4; 242/77.4, 86.5, 242/86.51, 116

[56] References Cited

UNITED STATES PATENTS

| | | |
|---|---|---|
| 3,542,172 | 11/1970 | Meletti................................191/12.2 R |
| 2,649,260 | 8/1953 | Beneke................................242/77.4 |
| 3,061,234 | 10/1962 | Morey................................191/12.2 R |
| 3,400,230 | 9/1968 | Becker et al. ........................191/12.2 R |
| 3,374,319 | 3/1968 | Stahmer.............................191/12.2 R |
| 3,380,545 | 4/1968 | Kemper..............................191/12.2 R |

*Primary Examiner*—Drayton E. Hoffman
*Attorney*—E. Wallace Breisch

[57] ABSTRACT

A cable reel assembly and more particularly a cable reel assembly of a type used to carry electrical trailing cable for a shuttle car and which reel assembly is provided with means which enable the rapid assembly and disassembly thereof.

12 Claims, 6 Drawing Figures

INVENTOR
VICTOR H. GARMONG

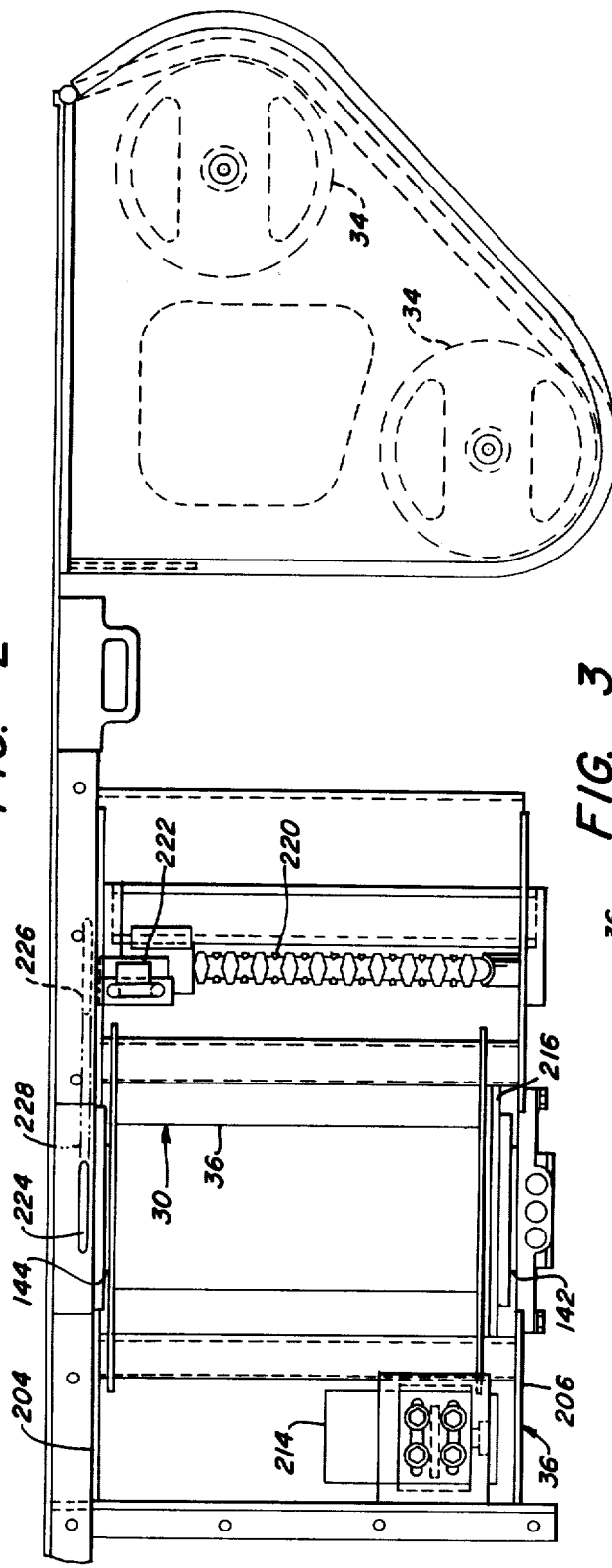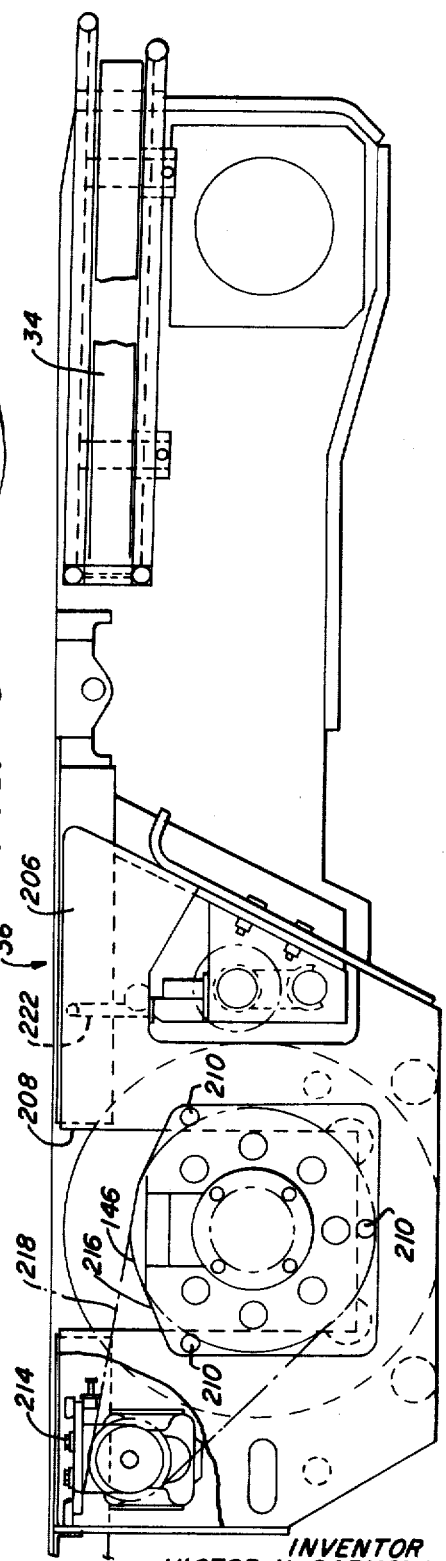

INVENTOR
VICTOR H. GARMONG

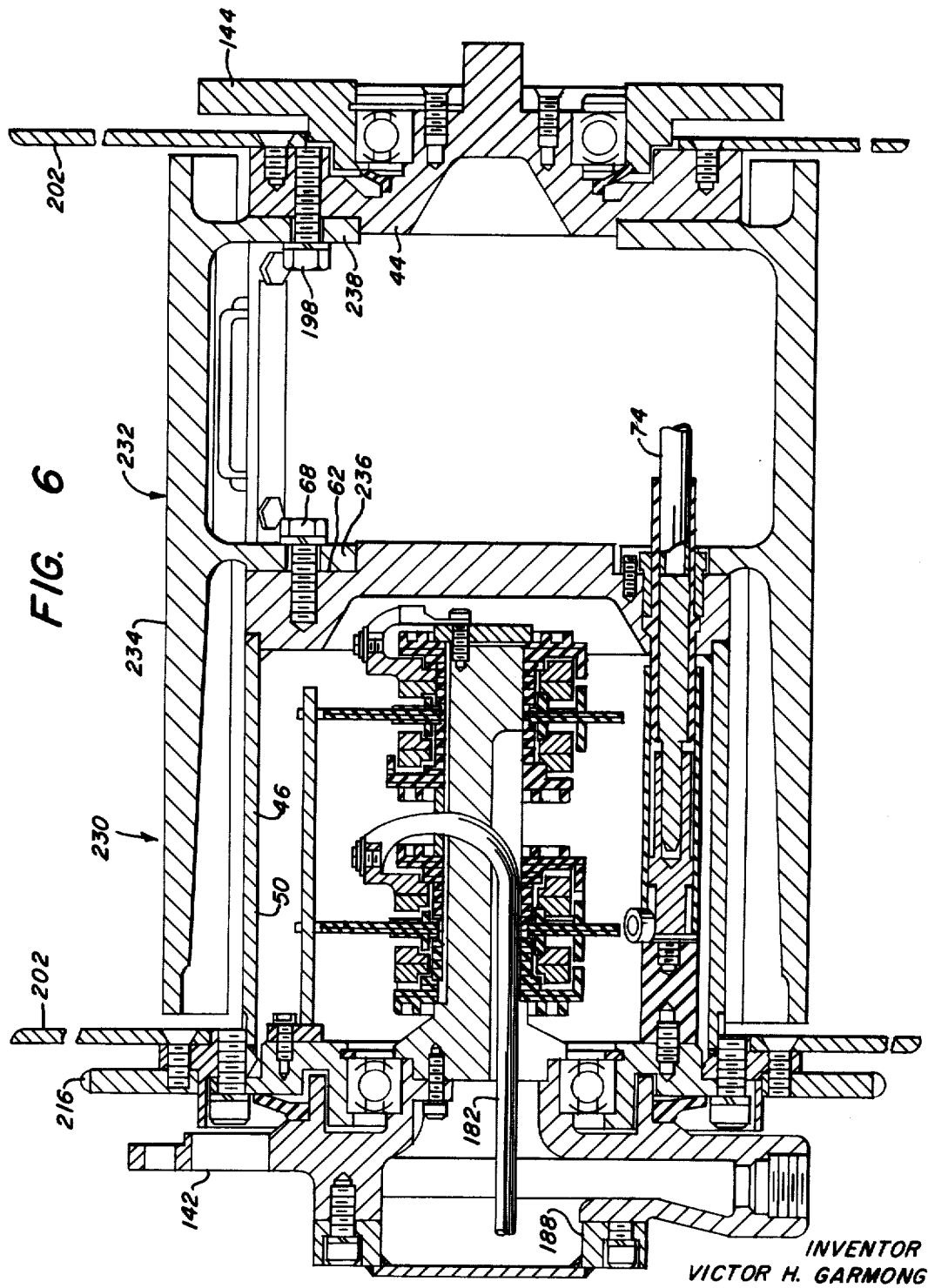

CABLE REEL

Various electrically powered vehicles which do not carry a self-contained power source therewith, such as shuttle cars used in underground mining, are provided energy by means of an electrical trailing cable which extends between a power source and the vehicle. With such vehicles a cable reel assembly is generally used to carry the trailing cable to selectively pay out and reel in the cable as the movement of the vehicle necessitates. Such prior cable reel assemblies have proved capable in the operation thereof, however, the construction thereof was generally unitized and, accordingly, when maintenance was required or the trailing cable had to be replaced, substantially the entire cable reel assembly had to be dismantled. Such dismantling of the cable reel assembly was both time consuming and expensive and often involved cutting and welding operations.

By meanS of the present invention which includes a cable reel assembly consisting of cooperating portions which are releasably secured together, the maintenance of the cable reel and the replacement of trailing cable can be easily accomplished because of the releasable construction of such cable reel.

These and other objects and advantages of this invention will become readily apparent from the reading of the following description and drawings in which:

FIG. 2 is a top plan view of a stationary bracket having a cable reel assembly of the present invention carried therewithin;

FIG. 3 is a side-sectional view of the stationary bracket shown in FIG. 2;

FIG. 6 is a side cross sectional view of another cable reel assembly of the present invention.

Figure 1:
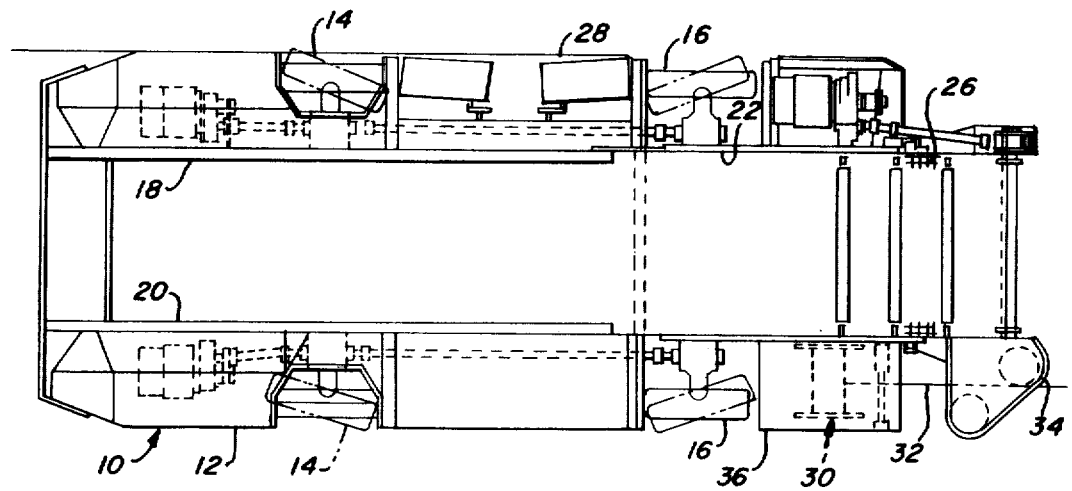
FIG. 1 is a top plan view of a shuttle car embodying the cable reel assembly of this invention.

A mine haulage vehicle or shuttle car 10 which incorporates therein a cable reel assembly of the present invention comprises a body 12 mounted on pairs of front and rear traction and steering wheels 14 and 16, respectively, and additionally includes a material receiving compartment 18 extending longitudinally through body 12 between wheels 14 and 16. Compartment 18 includes a material receiving end portion 20 and a material discharge end portion 22. Extending along the bottom of compartment 18 is a conventional endless flight conveyor (not shown). Discharge end portion 22 includes a tiltable end frame 26 which is tiltable to effect variation in the discharge height of the conveyor. Arranged at one side of the discharge end portion 22 is an operator and control station 28. Arranged at the opposite side of the discharge end portion 22 is a cable reel assembly 30 of this invention on which a power conductor cable 32 is wound. The tiltable end frame 26 carries suitable guides 34 for the cable 32, whereby the latter can be extended in various directions from the vehicle into connection with a suitable source of electric power (not shown).

Figure 5:
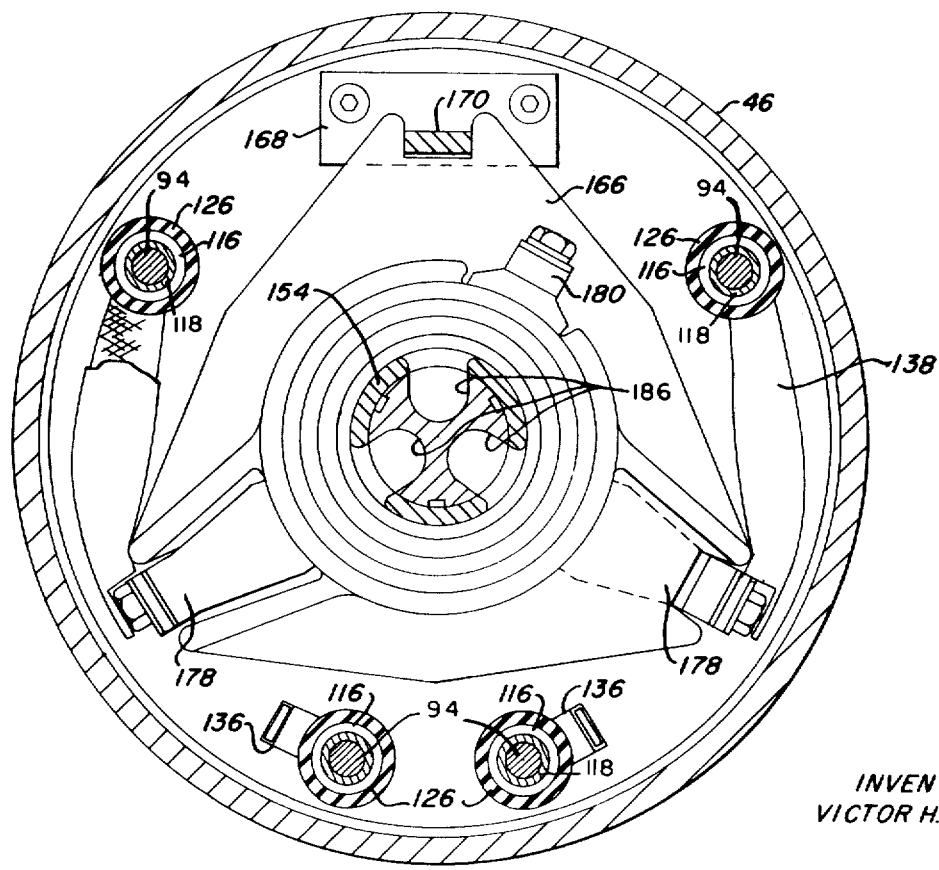
FIG. 5 is a cross sectional view of the cable reel assembly taken on line 5—5 of FIG. 4.
Figure 4:
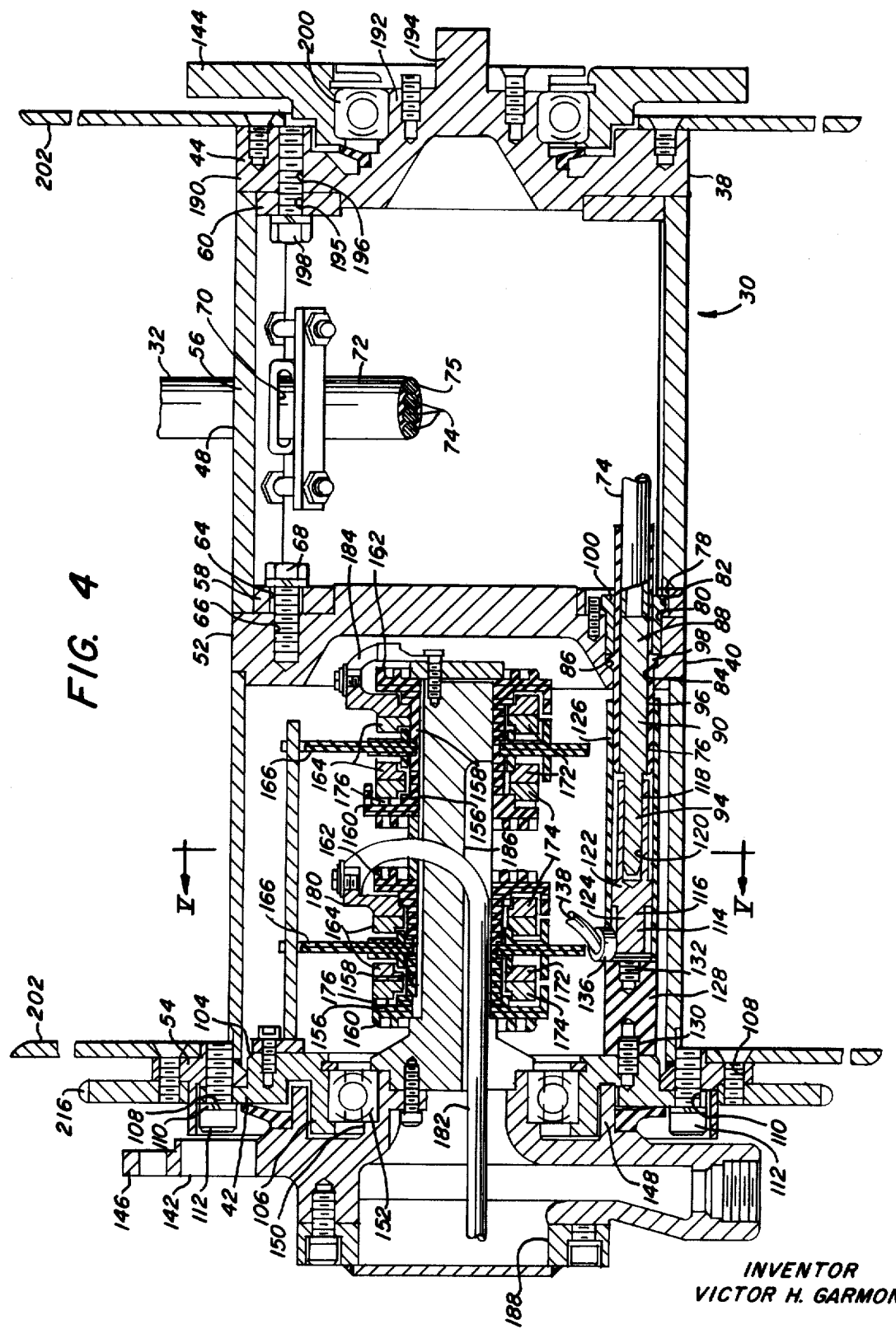
FIG. 4 is a side-elevational view of the cable reel assembly of the present invention.

Inasmuch as the invention herein resides in the cable reel assembly 30 and the balance of the elements specified hereinabove are well known in the art, further description of such known elements will not be set forth except where necessary in the description of cable reel assembly 30. For purposes of the hereinafter set forth description, forward and rearward shall refer respectively to the left and right ends of cable reel 38 as viewed in FIGS. 4 and 5.

Cable reel assembly 30 comprises an elongated generally cylindrical cable reel 38 which is releasably and rotatably supported by a stationary bracket 36. Cable reel 38 includes an elongated generally cylindrical drum member 40 which is coaxial with and extends along the longitudinal axis X—X of reel 38 and which has forward and rearward bearing end caps 42 and 44 which are releasably secured thereto at the respective axial ends thereof. Drum member 40 comprises forward and rearward generally cylindrical sub assemblies 46 and 48, respectively. As hereinafter described in detail, sub assemblies 46 and 48 are coaxially aligned and releasably secured together to form the drum 40 upon which the cable 32 is trained.

The forward drum sub assembly 46 comprises: a hollow cylindrical intermediate portion 50; a solid cylindrical rear hub portion 52 having an outer diameter thereof equal to the outer diameter of portion 50 and which is fixedly secured to portion 50 adjacent the rearward end thereof; and an annular front flange portion 54 which has the inner periphery thereof fixedly secured to portion 50 adjacent the forward end thereof and which extends radially outwardly therefrom. Portions 50, 52 and 54 are coaxial with respect to axis X—X.

The rear drum sub assembly 48 comprises: a hollow cylindrical intermediate portion 56 having an outer diameter thereof equal to the outer diameter of portion 50; and forward and rearward annular flange portions 58 and 60, respectively, which have outer diameters thereof which are equal to the inner diameter of portion 56. Portions 58 and 60 have the outer periphery thereof fixedly secured to the inner periphery of portion 56 adjacent the forward and rearward ends thereof, respectively, and extend radially inwardly therefrom. Portions 56, 58 and 60 are coaxial with respect to axis X—X and the axially forwardmost surface of portion 58 and the axially rearwardmost surface of portion 60 are in alignment with respective end surfaces of portion 56.

An annular seating groove 62 extends radially inwardly from the outer periphery of hub 52 adjacent the rear axial end thereof. Groove 62 has a radial inward extent thereof shown as substantially equal to a radial length measured from the outermost periphery of intermediate portion 56 to the radial innermost periphery of forward flange portion 58. In the assembly of drum member 40, flange portion 58 is seated within groove 62 and such seating is releasably retained in any suitable manner. An example of the above mentioned releasable retention includes a plurality of bores 64 which are circumferentially spaced about flange portion 58 intermediate the radial inner and outer peripheries thereof and which extend through portion 58 parallel to axis X—X. After the seating of flange portion 58 on groove 62, the bores 64 are aligned with respective ones of a plurality of rearwardly open blind bores 66 which extend axially forwardly within hub 62 and which have the inner periphery thereof threaded. After the above described aligning of bores 64 and 66, a set screw 68 is inserted through each of the bores 64 and threadably received within bores 66 thereby releasably securing flange portion 58 to hub 52 and, as such, releasably securing drum sub assemblies 46 and 48 together to form the assembled drum member 40.

A cable receiving opening 70 extends transversely through drum sub assembly 48 intermediate the axial ends thereof for receiving an end portion 72 of cable 32 within the interior thereof. Cable end portion 72 is stripped of the outer layer of insulation thereof to reveal a plurality, as shown three, separately insulated electrical conductors 74 and a ground conductor 75. Conductors 74 and 75 have the inner ends thereof stripped of insulation and are suitably electrically and mechanically connected to respective male connectors 76 in a manner as hereinafter described.

Flange portion 58 includes a plurality of circumferentially spaced connector receiving bores 78 intermediate the radial inner and outer peripheries thereof and which extend through bore portion 58 parallel to axis X—X. Bores 78 are coaxially aligned with respective connector receiving stepped bores 80 which extend through rear hub 52. Stepped bore 80 comprises a rearward portion 82 and a reduced diameter forward portion 84. A male connector seating surface 86 is formed where the forwardmost end of bore portion 82 meets the rearwardmost end of bore portion 84.

Each male connector 76 includes an elongated stepped cylindrical male contact 88 constructed of a suitable electrically conductive material and which comprises: a solid rearward portion 90; and a forward mating portion 94 having a diameter thereof less than the diameter of portion 90. A forward portion of conductors 74 and 75 are positioned in suitable electrical and mechanical engagement with respective ones of connectors 76 adjacent the rearward ends of connector portion 90. An elongated annular sleeve 96 of any suitable insulating material is received on portion 92 and snugly engages the outer periphery thereof. The orientation and axial length sleeve 96 is such that the forwardmost end thereof is in transverse alignment with the forwardmost end of connector portion 90 and the rearwardmost end thereof is spaced axially rearwardly from the rearwardmost end of portion 90 and snugly engages a forward portion of a respective conductor which is received therewithin. The outer diameter of sleeve 96 is shown as at least equal to the diameter of bore portion 84. Intermediate the axial ends of sleeve 96 a seating flange 98 extends radially outwardly from the outer periphery thereof for a purpose hereinafter described.

With sleeve 96 snugly received on rod 88 as described above, each connector 76 is axially inserted through respective aligned bores 78 and 80 until the forward end of seating flange 98 engages seating surface 86. The engagement of seating flange 98 against surface 86 is retained by means of an annular packing nut 100 which has a threaded outer periphery and an inner diameter equal to or less than the outer diameter of sleeve 96. Packing nut 100 is inserted over sleeve 96 rearwardly of flange 98, moved forwardly through bore 78 and thereafter threadably retained within bore portion 82. Packing nut 100 is rotated within bore portion 82 until seating flange 98 tightly engages surface 86. When contact 88 is retained in a manner described immediately above, a portion 90 and the adjacent encircling annular sleeve 96 and mating portion 94 project forwardly within drum sub-assembly 46 along an axis shown as substantially parallel to axis X—X.

Forward bearing cap 42 has a generally annular cross section and includes a rear portion 104 and a reduced diameter forward portion 106. A plurality of bores 108 are circumferentially spaced about flange portion 54 of drum sub-assembly 46 intermediate the radial inner and outer peripheries thereof and extend through flange portion 54 parallel to axis X—X. Bores 108 are aligned with respective ones of a plurality of coaxial bores 110 which extend axially forwardly through rear portion 104 of cap 42. The inner periphery of bores 108 and 110 are threaded for receiving a respective set screw 112 rearwardly therein to releasably secure forward bearing cap 42 to the forward end of drum sub assembly 46.

A plurality of elongated female connectors 114 have the forwardmost ends thereof in releasable communication with a rearward surface of cap 42 intermediate the inner and outer peripheries thereof. Connectors 114: extend rearwardly from cap 42 along an axis generally parallel to axis X—X; have the radial outermost surfaces thereof spaced radially inwardly from the inner periphery of drum sub assembly 46; and have the rearwardmost ends thereof intermediate the axial ends of assembly 46. As hereinafter described in detail, when connectors 114 are positioned within assembly 46 and assemblies 46 and 48 are aligned and releasably secured together as described hereinbefore, female connectors 114 will receive a forward portion of respective male connectors 76 therewithin.

Each female connector 114 includes an elongated generally cylindrical contact 116 constructed of a suitable electrically conductive material and which comprises: a rearward portion 118 having a coaxial rearwardly open blind bore 120 extending forwardly therein along an axis generally parallel to axis X—X; a solid intermediate portion 122 having a diameter thereof greater than the outer diameter of portion 118; and a forward portion 124 having a diameter thereof as shown as substantially equal to the diameter of rear portion 118. An elongated annular sleeve 126 of any suitable insulating material and having an axial length thereof greater than the axial length of contact 116 is coaxially received on contact 116 and snugly engages the outer periphery of portion 122. Sleeve 126 is oriented such that the forwardmost end thereof is in substantial alignment with the forwardmost end of contact 116 and the rearwardmost end thereof is spaced axially rearwardly from the rearwardmost end of contact 116.

Connectors 114 are retained in the above mentioned releasable communication with cap 42 by means of respective forwardly extending generally cylindrical plug members 128, formed of any suitable insulating material and which have the forwardmost ends thereof suitably releasably secured to the rearward surface of cap 42 such as by dowel screws 130 communicating therebetween. Plug members 128 extend rearwardly from cap 42 along an axis generally parallel to axis X—X and have an outer diameter thereof substantially equal to the outer diameter of sleeves 126.

Connectors 114 are coaxially aligned with respect to plug members 128 and the forwardmost ends thereof are axially spaced from the rearwardmost ends of plug members 128. Such alignment and spacing is releasably retained in any suitable manner for example, dowel screws 132 which coaxially communicate between member 128 and the forward portion 124 of contact 116.

An electrically conductive conductor contact 136 is suitably disposed within each connector 114 and is in electrical and mechanical engagement with forward portion 124 adjacent the forward end thereof. Contact 136 is suitably electrically mechanically coupled to the respective conductor 138 which extends radially inwardly from connector 114. As hereinafter described in detail the radial inward ends of conductors 138 are in suitable electrical and mechanical engagement with respective slip ring assemblies 164.

Cable reel 30 is rotatably supported adjacent the axial ends thereof by forward and rearward stationary end caps 142 and 144, respectively. End cap 142 comprises a forward portion 146 shown as having a generally square cross section; and an annular rear portion 148 which is coaxial with portion 146 and has an outer diameter thereof less than the side dimensions of portion 146 and less than the outermost diameter of end cap 42. Intermediate the inner and outer peripheries of portion 148, a rearwardly opening annular groove 150 extends coaxially forwardly within portion 148. The outer diameter of groove 150 is at least equal to the outer diameter of forward portion 106 of cap 42 and the inner diameter thereof is less than the inner diameter of portion 106.

With a construction as described immediately above the forward end of cable reel 30 is rotatably supported by end cap 142 by coaxially aligning reel 30 with cap 142 and thereafter receiving portion 106 of cap 42 within the annular groove 150. A plurality of suitable bearings 152 are engagingly disposed intermediate the periphery of portion 106 and the innermost inner periphery of groove 150 for the rotatable supporting of the forward end of reel 30 by stationary end cap 142.

An elongated generally cylindrical slip ring shaft 154 has the forwardmost end thereof suitably releasably secured to end cap 142 and extends coaxially rearwardly therefrom along axis X—X. The rearwardmost end of shaft 154 is forwardly spaced from hub 52 when cap 142 is in assembled position with reel 30. A plurality, as shown two, annular electrical insulators 156 are releasably and non-rotatably supported adjacent the outer periphery of shaft 154. Each insulator 156 comprises an intermediate portion 158 and forward and rearward flange portions 160 and 162, respectively, which extend radially outwardly from portion 158. A pair of annular slip ring assemblies 164 are disposed around each insulator 156 intermediate flange portions 160 and 162. An electrical insulator 166 is disposed around each insulator 156 intermediate the respective pair of slip ring assemblies 164. Insulator 156 is in rotating relationship with an insulator support bracket 166. Support bracket 166 comprises: a forward flange portion 168 which is releasably secured to cap 42 intermediate the inner periphery of portion 50 and the radial outermost extent of insulator flange portion 160 and 162; and an elongated rear support portion 170 which has the forwardmost end thereof fixedly secured to flange portion 168 and which extends rearwardly therefrom along an axis generally parallel to axis X—X.

Each slip ring assembly 164 comprises; an annular rotating slip ring 172 which encircles shaft 154 nearest the respective axial face of insulator 166 and is spaced therefrom, and annular stationary slip ring 174 which encircles shaft 154 nearest the respective axial surface of flange portion 160 or 162 and is spaced therefrom. Rings 172 and 174 have the respective axial faces thereof, such faces being opposite from the above described axial faces of the insulators, in sliding and electrical engagement with each other. Such engagement is maintained by any suitable means of biasing, for example, a plurality of springs 176 suitably disposed intermediate flange 160 and 162 and the respective slip rings 174 adjacently spaced therefrom. In any suitable manner, slip rings 172 are captively and rotatably keyed to insulators 166 and slip rings 174 are captively and non-rotatably keyed to insulators 156.

Slip ring 172 has a radially outwardly extending conductor coupling portion 178 upon which a radially inner end of a respective conductor 138 is electrically and mechanically connected. Inasmuch as rings 172 are in rotatably synchronism with conductors 138, there is no relative movement between such elements. The forward three slip rings 172 are in communication with charged conductors 138 which depend from a connector 114 which in turn is in communication with an electrical conductor 74. The rearwardmost slip ring 172 is in communication with a ground conductor 138 which depends from a connector 114 which in turn is in communication with ground conductor 75.

Each slip ring 174 has a radially outwardly extending conductor coupling portion 180. The forward three slip rings 174 are in rotating electrical engagement with the charged slip rings 172 and, as such, electrical conductors 182 are suitably electrically and mechanically coupled to respective coupling portions 180. The rearwardmost slip ring 174 is in rotating ground engagement with a grounded slip ring 172 and a ground conductor 184 is suitably coupled to the respective coupling portion 180. Conductor 184 extends radially inwardly from coupling portion 180 and has the innermost ends thereof in releasable engagement with slip ring shaft 174 thereby providing a suitable ground for cable reel 38.

Slip ring shaft 154 has a plurality, as shown three, of circumferentially spaced, longitudinally extending conductor receiving grooves 186 which have the forward ends thereof opening into the hollow interior 188 of forward end cap 142. Conductors 182; extend radially inwardly from coupling portion 180, are thereafter received within respective grooves 186 and extend forwardly therein into interior 188 whereat conductors 182 extend radially outwardly to a suitable junction box (not shown) to suitably provide electrical power for various well known shuttle car operations.

Rear end cap 44 has a generally circular cross section and includes: a forward portion 190 having an outer diameter thereof substantially equal to the outer diameter of the portion 56 of rear drum sub assembly 48; an intermediate portion 192 having a diameter thereof less than the diameter of portion 190 and coaxial therewith; and a reduced diameter spindle portion 194 which extends coaxially rearwardly from portion 192. A plurality of bores 195 are circumferentially spaced about flange portion 60 of drum sub assembly 48, intermediate the radial inner and outer peripheries thereof, and extend through flange portion 60 parallel to axis X—X. Bores 195 are aligned with respective ones of a plurality of coaxial bores 196 which extend through forward portion 190 of cap 44. The inner periphery of bores 195 and 196 are threaded for receiving a respective cap screw 198 rearwardly therein to releasably secure rear bearing cap 44 to the rearward end of drum sub assembly 48.

Stationary end cap 144 is a generally annular cross section and has an inner diameter thereof larger than the outer diameter of the intermediate portion 192 of end cap 44. With such a construction as described immediately above the rearward end of cable reel 30 is rotatably supported by end cap 144 by coaxially aligning reel 30 and cap 144 and thereafter receiving the portion 192 within the interior of cap 144. A plurality of suitable bearings 200 are engagably disposed intermediate the outermost periphery of portion 192 and the innermost periphery of cap 144 for the rotatable supporting of the rearward end of reel 30 by stationary end cap 144.

Cable reel 38 is additionally provided with a pair of axially spaced annular cable retaining flanges 202 which are suitably releasably disposed adjacent the respective axial ends of drum member 40, extend radially outwardly therefrom, and are rotatable therewith. Flanges 202 retain the trained cable 32 intermediate the axial ends of drum member 40.

As hereinbefore mentioned, cable reel 38 is releasably and rotatably retained within the stationary bracket 36. Bracket 36 is of a general box like configuration which has the upper side thereof open and has the inner side 204 thereof suitably secured to a side of the shuttle car body 12 adjacent the discharge end of car 10.

Cable reel assembly 30 is transversely received by bracket 36 such that the rearward end thereof is adjacent side 204 and the forward end thereof is adjacent side 206. Side 206 is a side of bracket 36 which is transversely spaced from side 204. Side 206 is shown as having an upwardly open downwardly extending slot 208 therein. The width of slot 208, that is, the measurement thereof taken parallel to the longitudinal axis of shuttle car 10, is at least greater than the outermost diameter of the rearward portion 148 of forward bearing cap 142.

Cable reel assembly 30 is releasably disposed within bracket 36 by suitably captively and non-rotatably supporting rearward end cap 144 adjacent bracket side 204 and captively and non-rotatably supporting forward end cap 142 within slot 208. After such disposition the forward end portion 146 of cap 142 engages the outer face of side 206 and is releasably retained in such engagement in any suitable manner, for example as shown, a plurality of bolts 210 threadably communicate between cap portion 146 and side 206. Bolts 210 are positioned intermediate the outer peripheries of slot 208 and cap portion 146.

Cap portion 146 has a plurality of circumferentially spaced hand holes 212 inwardly spaced from the outer periphery thereof. The diameter of the circumference upon which hand holes 212 are spaced is coaxial with axis X—X and is substantially equal to the diameter of the circumference upon which bores 108 and 110 are spaced thereby allowing the alignment of hand holes 212 with screw screws 112, by rotating reel 38 until screws 112 register with respective hand holes 212, thereby facilitating the disassembly of a forward portion of cable reel assembly 30 as hereinafter described.

With cable reel assembly 30 disposed within bracket 36 as described hereinabove, the cable reel 38 is rotatably driven by means of a suitable hydraulic motor 214 fixedly secured to bracket 36 and which receives hydraulic pressure fluid from any suitable source (not shown). An annular sprocket 216 is releasably secured to cable reel 38 adjacent the forward end of flange portion 54 and extends radially outwardly therefrom. Motor 214 rotatably drives reel 38 by means of a chain 218 which communicates between the output shaft thereof and sprocket 216. An elongated spooling or feed shaft 220 is rotatably secured to and extends transversely between the bracket sides 204 and 206. The outer periphery of the feed shaft 220 is spaced from reel 30 and provided with suitable threads as is well known in the art to drive a spooling eye 222 longitudinally along shaft 220 to facilitate the uniform training of cable 32 about the cable reel 38. Shaft 220 is rotated to drive spooling eye 222 in any suitable manner, for example, respective sprockets 224 and 226 are rotatably keyed to spindle portion 194 of cap 44 and to shaft 220 adjacent the innerside thereof and a drive chain 228 drivingly communicates between such sprockets.

To deenergize or "unplug" a cable reel assembly 30 without removing the entire assembly from bracket 36, reel 38 is rotated until set screws 112 are coaxially aligned with respective hand holes 212. After such aligning, screws 112 are removed from bores 108 and 110 and also bolts 210 are removed from cap portion 146 and side 206 thereby allowing the "unplugging" of assembly 30 by applying an axially forwardly directed force on forward end cap 142. Such axial force will result in female connectors 114 becoming disengaged from respective male connectors 76 and a forward internal portion of assembly 38 can be pulled forwardly through slot 208 until completely free of bracket 36. After the above mentioned forward internal portion of assembly 38 is free of bracket 36; rear drum sub assembly 48, forward drum intermediate portion 46, hub 52, rear end cap 44, male connectors 76, sprocket 216 and cable retaining flanges 202 are all retained within bracket 36. It can readily be seen that the portion of reel assembly 30 remaining within bracket 36 can be readily disassembled by lifting such portion upwardly out of bracket 36 and thereafter removing the releasable fastening means as replacement, repairing and/or operational conditions dictate.

Conversely, an "unplugged" cable reel assembly 30 can be reassembled by: aligning the above mentioned first removed internal portion of assembly 30 with the portion thereof retained within bracket 36 after the above described unplugging; "plugging" assembly 30 by the electrical and mechanical reception of male connectors 76 within respective female connectors 114; and releasably securing assembly 30 within bracket 36 by threadably replacing screws 112 and bolts 210 in the respective positions thereof.

FIG. 6 shows another embodiment of a cable reel assembly 230 constructed according to the principles of the present invention. Assembly 230 is identical to cable reel assembly 30 as described hereinbefore with the singular exception that rearward drum sub assembly 232 of reel assembly 230 is different from rearward drum sub assembly 48 of reel assembly 30. Accordingly all elements of assembly 230 which are identical to those of assembly 30 will be given the same reference numerals. Furthermore, it will be understood that those elements of FIG. 6 which are not given reference numerals are the same as similarly oriented elements of reel assembly 30 and, as such, reference is hereby made thereto for a description thereof.

Rearward drum sub assembly 232 is coaxial with respect to axis X—X and comprises: a hollow cylindrical cable training portion 234 having an inner diameter thereof greater than the outer diameter of intermediate portion 50 of forward drum sub assembly 46 and having an axial length thereof shown as slightly less than the portion of the axial length of reel assembly 230 intermediate cable retaining flanges 202; and forward and rearward annular flange portions 236 and 238, respectively, which depend radially inwardly from the inner periphery of cable training portion 234. Flange portion 238 is spaced slightly forwardly of the rearward axial end of portion 234 and flange portion 236 is located intermediate portion 238 and the axial end of portion 234.

In assembly of cable reel assembly 230 a radial inward end of flange portion 236 is releasably seated within groove 62 and flange portion 238 is releasably secured to rear bearing 44 in any suitable manner, for example, the reception of set screws 68 and 198 within respective aligned bores as hereinbefore described with reference to cable reel assembly 30. After the above described assembly of drum sub assembly 232, the conductor cable 32 is trained about the outer periphery of sub assembly 232 which extends intermediate cable retaining flanges 202 and has the respective axial ends thereof spaced from such flanges a distance less than the narrowest dimension of conductor cable 32.

It is to be noted that the use of a drum sub assembly such as 232 rather than a drum sub assembly 48 as hereinbefore described merely changes the outer diameter of the peripheral surface upon which conductor cable 32 is trained and in no way effects the "plugging" and "unplugging" feature of this invention as hereinbefore described with reference to cable reel assembly 30. Furthermore, other rear drum sub assemblies which are similar to sub assembly 232 and have an inner diameter thereof greater than the outer diameter of forward drum sub assembly 46 can be provided which would be readily interchangable with rearward sub assemblies 48 and/or 232 to further vary, as conditions dictate, the diameter of the peripheral surface upon which the conductor cable 32 is wound.

Significant features of the present invention include: the capability of "plugging" and "unplugging" the reel assembly without removing it from the supporting bracket; and the releasable construction of the reel assembly which facilitates the rapid and non-destructive disassembly thereof and also facilitates the adaption of the reel assembly to various diameter drum portions. Accordingly, by following the principles taught by this invention, one skilled in the art can achieve the hereinabove mentioned features with structural alterations to the preferred embodiments described hereinbefore, for example: releasable fastening means can be provided other than those described herein; the "plugging" and "unplugging" feature can be accomplished without the necessity of having the rearward portion of the reel assembly of a releasable construction; cable reels of this invention can be provided which are adapted to have interchangeable diameter drum portions without necessarily having the cable reel "plugging" and "unplugging" feature; cable reels of this invention can be provided which are adapted to have the "plugging" and "unplugging" feature without necessarily having the interchangeable drum diameter feature; and the like.

The description herein does not limit the scope of this invention and the invention is described by the scope of the claims set forth hereinafter.

What is claimed is:

1. In a cable reel assembly of the type in which an electrical conduit is wound upon an elongated drum located between cable retaining flanges and which is rotatably supported by a stationary support, the improvement comprising: drum retaining means having a stationary portion which is releasably secured to such a stationary support and having a rotatable portion which is releasably secured to said drum adjacent an axial end thereof and adjacent said stationary support, first and second connector means carried within said drum; said first connector means being adapted to connect to conductors of such an electrical conduit; said second connector means being carried by said rotatable portion of said retaining means and being electrically detachable engagable with said first connector means; said first and second connector means, said rotatable portion of said retaining means and said drum being in rotatable synchronism with each other and rotatable with respect to said stationary support and said stationary portion.

2. A cable reel assembly as specified in claim 1 wherein said second connector means is adapted to connect to load side conductor means.

3. A cable reel assembly as specified in claim 2 wherein said load side conductor means includes: a stationary slip ring shaft carried within said drum and supported by said stationary portion of said drum retaining means; a plurality of stationary electrically conductive slip rings carried by said shaft and adapted to connect to stationary load conductors; a plurality of rotating electrically conductive slip rings in rotating engagement with respective ones of said stationary slip rings and adapted to connect to said second connector means by means of rotating conductors extending therebetween; and said rotating conductors and said rotating slip rings being in rotatable syncronism with said drum.

4. A cable reel assembly as specified in claim 1 wherein said first connector means is supported within said drum intermediate the axial ends thereof.

5. A cable reel assembly as specified in claim 4 wherein said first connector means is releasably supported within said drum.

6. A cable reel assembly as specified in claim 1 additionally including insulating means to isolate said first and second contact means from electrical engagement with said drum.

7. A cable reel assembly as specified in claim 1 wherein said drum member comprises a plurality of coaxially aligned generally annular portions releasably secured together at respective axially abutting sections thereof.

8. A cable reel assembly as specified in claim 7 wherein the outer diameters of said annular portions are equal and the electrical conduit is wound about the outer peripheries thereof.

9. A cable reel assembly as specified in claim 7 wherein said plurality of annular portions is two and includes a first and second annular portion; said first portion having an outer diameter thereof less than the inner diameter of said second annular portion and being coaxially received within said second annular portion; and the electrical conduit being wound about the outer periphery of said second portion only.

10. A cable reel assembly for a mobile unit powered by a trailing electrical conduit comprising; an elongated generally cylindrical drum member, a support member for rotatably supporting said drum member; said drum member having coaxial hollow drum portions axially movable relative to each other and releasably secured together with respective radial surfaces in abutting relationship for supporting such an electrical conduit on a peripheral surface of said drum member, a plurality of electrical connector means supported by said drum portions respectively, certain of said electrical connector means supported by one drum portion being electrically disconnected from certain other of said electrical connector means supported by another of said drum portions upon axial movement of said one drum portion away from said another drum portion and electrically connected when said drum portions are in said abutting relationship, and means for electrically connecting said certain electrical connector means to the conductors of such a conduit, and means for connecting said other electrical connector means to means adapted to be connected to a load conductor means of such a unit.

11. A cable reel assembly as specified in claim 10 wherein the outer diameters of said drum portions are equal and the electrical conduit is wound about the outer peripheries thereof.

12. A cable reel assembly as specified in claim 10 wherein the number of said drum portions is two and said another portion has an outer diameter thereof less than the inner diameter of said one drum portion and is coaxially received within said one drum portion; and the electrical conduit is wound about the outer periphery of said one drum portion only.

* * * * *